United States Patent
Diefenbaugh et al.

(10) Patent No.: US 9,110,735 B2
(45) Date of Patent: Aug. 18, 2015

(54) MANAGING PERFORMANCE POLICIES BASED ON WORKLOAD SCALABILITY

(71) Applicant: Intel Corporation, Santa Clara, CA (US)

(72) Inventors: Paul S. Diefenbaugh, Portland, OR (US); Andrew D. Henroid, Portland, OR (US); Eliezer Weissmann, Haifa (IL); Krishnakanth V. Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 13/728,327

(22) Filed: Dec. 27, 2012

(65) Prior Publication Data

US 2014/0189694 A1    Jul. 3, 2014

(51) Int. Cl.
| G06F 1/00 | (2006.01) |
| G06F 9/46 | (2006.01) |
| G06F 15/173 | (2006.01) |
| G06F 9/50 | (2006.01) |
| G06F 1/32 | (2006.01) |

(52) U.S. Cl.
CPC ............ *G06F 9/5094* (2013.01); *G06F 1/3203* (2013.01); *Y02B 60/142* (2013.01)

(58) Field of Classification Search
None
See application file for complete search history.

(56) References Cited

U.S. PATENT DOCUMENTS

| 7,281,097 | B1 * | 10/2007 | Lawson et al. ............... 711/154 |
| 2003/0236894 | A1 * | 12/2003 | Herley ........................ 709/229 |
| 2004/0215987 | A1 | 10/2004 | Farkas et al. |
| 2006/0161752 | A1 * | 7/2006 | Burkey ....................... 711/170 |
| 2007/0011476 | A1 * | 1/2007 | Flautner et al. ............ 713/300 |
| 2008/0082983 | A1 * | 4/2008 | Groetzner et al. .......... 718/105 |
| 2008/0133435 | A1 * | 6/2008 | Chintalapti et al. .......... 706/12 |
| 2009/0055823 | A1 * | 2/2009 | Zink et al. ................... 718/100 |
| 2010/0057404 | A1 | 3/2010 | Dittmann et al. |
| 2011/0113274 | A1 | 5/2011 | Burchard et al. |
| 2011/0138388 | A1 * | 6/2011 | Wells et al. ................. 718/100 |
| 2011/0213950 | A1 | 9/2011 | Mathieson et al. |
| 2011/0264938 | A1 * | 10/2011 | Henroid et al. ............. 713/323 |
| 2012/0047319 | A1 * | 2/2012 | Yoon et al. .................. 711/103 |
| 2012/0079298 | A1 * | 3/2012 | Majumdar et al. .......... 713/320 |
| 2012/0173895 | A1 * | 7/2012 | Kim et al. ................... 713/300 |
| 2012/0303302 | A1 * | 11/2012 | Plestid .......................... 702/63 |
| 2013/0067465 | A1 * | 3/2013 | Fuhrman et al. ................ 718/1 |
| 2014/0047079 | A1 * | 2/2014 | Breternitz et al. ........... 709/220 |
| 2014/0089699 | A1 * | 3/2014 | O'Connor et al. ........... 713/322 |

OTHER PUBLICATIONS

Endo et al. "Predicting Scalability of Parallel Garbage Collectors on Shared Memory Multiprocessors". IEEE. 2001.*
International Search Report and Written Opinion received for Patent Application No. PCT/US2013/048376, mailed on Oct. 28, 2013, 9 pages.

* cited by examiner

*Primary Examiner* — Adam Lee
(74) *Attorney, Agent, or Firm* — Jordan IP Law, LLC

(57) ABSTRACT

Methods and systems may provide for identifying a workload associated with a platform and determining a scalability of the workload. Additionally, a performance policy of the platform may be managed based at least in part on the scalability of the workload. In one example, determining the scalability includes determining a ratio of productive cycles to actual cycles.

30 Claims, 2 Drawing Sheets

MANAGING PERFORMANCE POLICIES BASED ON WORKLOAD SCALABILITY

BACKGROUND

1. Technical Field

Embodiments generally relate to performance management in computing platforms. More particularly, embodiments relate to managing performance policies based on workload scalability.

2. Discussion

Computing platforms may manage processor performance by entering various performance states that range from relatively high operating frequency and power consumption (e.g., maximum performance) to relatively low operating frequency and power consumption (e.g., minimum performance). The determination of which performance state to select may traditionally be made in a demand based switching (DBS) fashion that is limited to meeting the quality of service (QoS) requirements of the workloads being processed. Such an approach may yield insufficient efficiency and responsiveness in certain circumstances.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
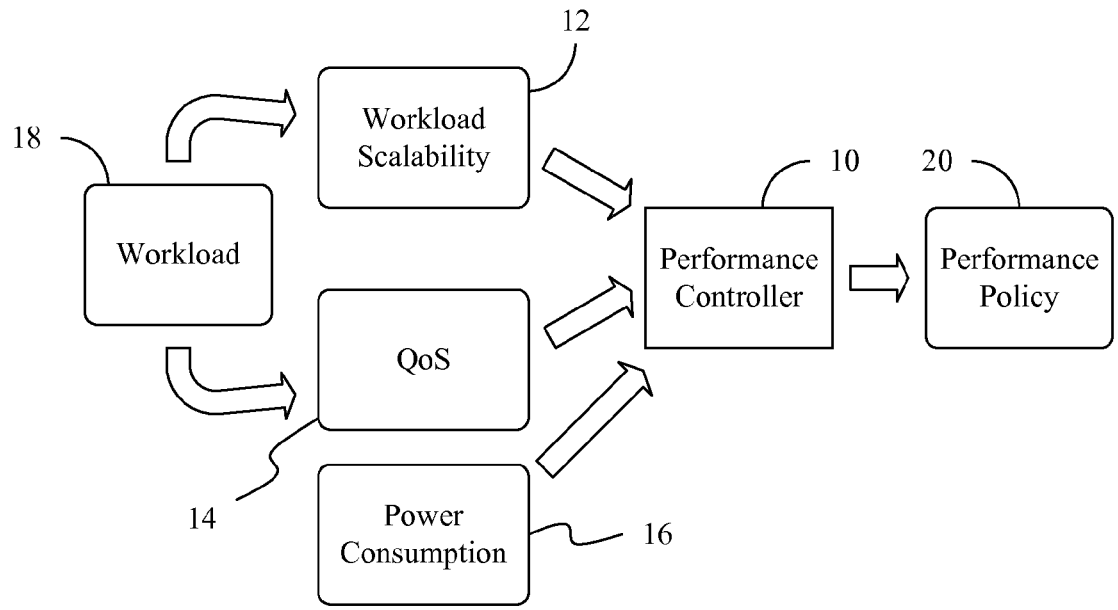
FIG. 1 is a block diagram of an example of a scheme of managing performance according to an embodiment.

FIG. 1 shows a scheme of managing performance in a computing platform such as, for example, a mobile device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). The illustrated scheme may also be used in a fixed platform such as, for example, a server, desktop computer, workstation, and so forth. In the illustrated example, a performance controller 10 obtains scalability information 12 and quality of service (QoS) information 14 associated with a workload 18 being processed and/or scheduled for processing on the platform. The workload 18 might include instructions/operations associated with activities such as, for example, network communications (e.g., transmitting and/or receiving), memory communications (e.g., reading and/or writing), computational processing (e.g., general purpose operations, graphics operations), and so forth.

Scalability may be thought of as a ratio of percent change in performance for a system or subsystem (requested) versus percent change in estimated performance realized by the workload (delivered). For example, if a workload realizes 5% higher performance when increasing processor performance by 10%, the scalability may be 5%/10%=50% (0.5). The realized performance for a given workload may be estimated in a number of different ways. Indeed, the scalability determination may be a function of the type of workload and/or hardware processing the workload. For example, a non-graphics workload may be assumed to have zero correlation (thus 0% scalability) with respect to the operating frequency of a graphics processing unit (GPU), whereas the same workload could have 80% scalability with respect to a central processing unit (CPU) core, 50% scalability with respect to a network controller, 70% scalability with respect to main memory.

While operating frequency may be one example of a requested performance metric, other parameters and/or variables may also be used. For example, the number of active cores in a multi-core system, the amount of available memory, the operating voltage, and so forth, may also be used to request a particular level of performance.

Figure 2:
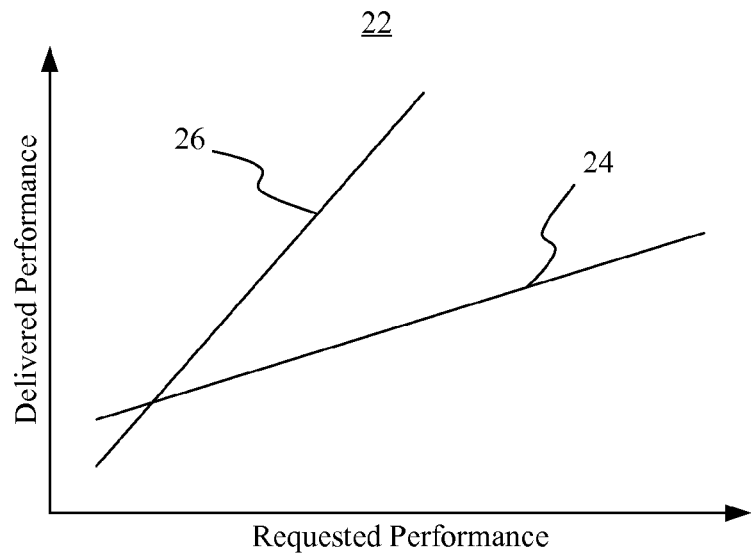
FIG. 2 is a plot of example of a set of workload scalability relationships according to an embodiment.

The performance controller 10 may also obtain other information such as power consumption information 16 for one or more portions (e.g., devices, subsystems, modules, etc.) of the platform, thermal constraints/limitations of the platform (not shown), and so forth, wherein the scalability information 12, QoS information 14, power consumption information 16 and thermal constraints may be used to manage a performance policy 20 for the platform. As will be discussed in greater detail, taking into consideration the workload scalability information 12 can enable the performance controller 10 to make more efficient decisions with regard to the performance policy 20 and ultimately render the platform more responsive. Turning now to FIG. 2, a plot 22 is shown in which the relationship between requested performance and delivered performance is provided for a set of workloads. More particularly, the relationships in the plot 22 can be considered indicative of workload scalability in the sense that more scalable workloads may deliver more performance per unit of requested performance than less scalable workloads. For example, a curve 24 may correspond to a workload that is less scalable than a workload corresponding to a curve 26, wherein the scalability may be a function of a wide variety of factors such as networking bandwidth, available memory, code complexity, etc. Moreover, these factors may be effectively quantified in a "productive cycles counter" that enables the workload scalability to be determined.

Thus, the workload scalability model described herein may be analogous to driving a car: the productive cycles counter can provide insight akin to that of sensor data such as miles per hour data, gallons per mile data, road incline data, etc., wherein a performance controller such as the performance controller 10 (FIG. 1) may use one or more control registers to establish a particular performance (e.g., operating frequency, number of active cores, amount of available memory, operating voltage) in a manner similar to manipulating a gas pedal. For example, the performance controller might request more performance to obtain a particular delivered performance if the productive cycles counter indicates that the workload has a relatively low scalability, just as a driver might press harder on the gas pedal when approaching a relatively steep incline. Similarly, the performance controller might request less performance to obtain the same delivered performance from a more scalable workload, as a driver might press more lightly on the gas pedal when traveling a road with no incline (or a decline). Simply put, greater efficiency and other advantages may be achieved by leveraging knowledge about the expected level of performance actually realized from a given requested level of performance.

Of particular note is that the performance controller may also use the scalability information to prioritize workloads in order to make the most efficient use of limited power/thermal resources when the system is constrained. Prioritizing scalable workloads can lead to more work being completed over time (i.e., higher efficiency). Higher scalability, however, can also sometimes result in higher power consumption (e.g., CPU-bound workloads can substantially increase CPU power). So, if a power/thermal issue is localized to the core (vs. platform) the most appropriate policy may be to prioritize a less-scalable workload or run the scalable workload at a lower performance (thus core power) level. Either way, the workload scalability information can be leveraged to significantly enhance the performance policy.

Figure 3:
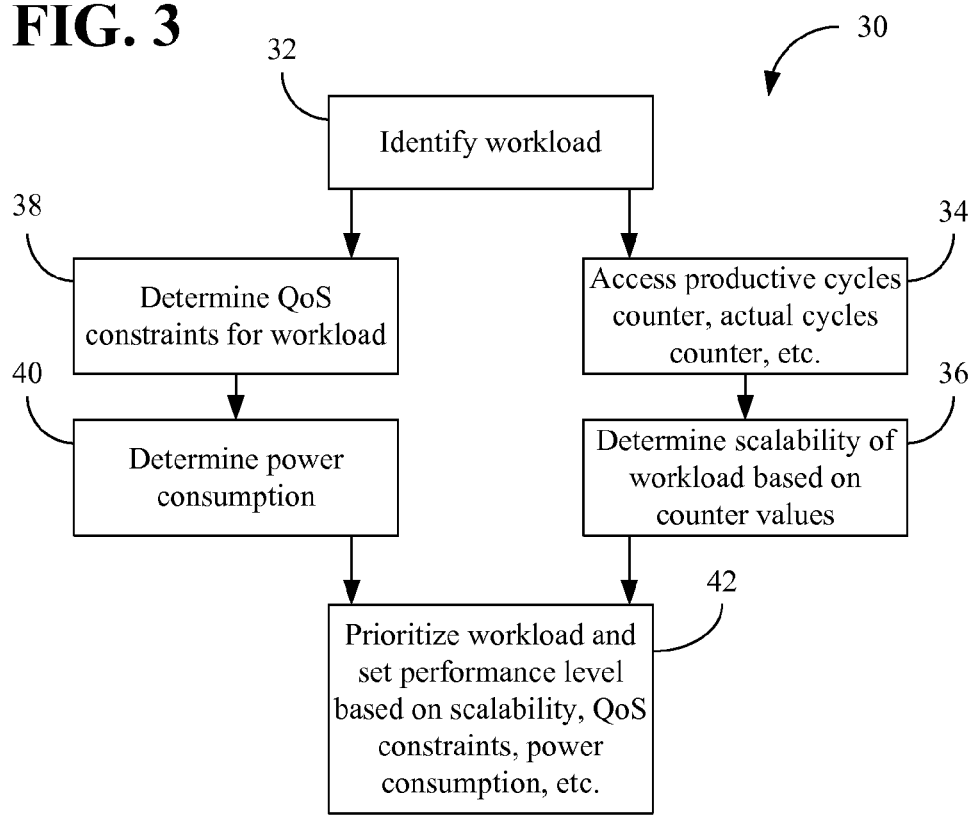
FIG. 3 is a flowchart of an example of a method of managing performance according to an embodiment.

FIG. 3 shows a method 30 of managing performance in a computing platform. The method 30 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as Java, Smalltalk, C++ or the like and conventional procedural programming languages, such as the "C" programming language or similar programming languages.

Illustrated processing block 32 provides for identifying a workload such as, for example, a network communications, memory communications and/or computational processing workload. One or more hardware counters may be accessed at block 34, wherein the counters might include a productive cycles counter (e.g., PCNT), actual cycles counter (e.g., ACNT), nominal counter (e.g., MCNT) and so forth. The productive cycles counter may identify the number of non-stalled cycles since the counter was last reset and the actual cycles counter may identify the number of total cycles since that counter was reset. In this regard, what constitutes a stalled cycle may be tunable (e.g., via programmable threshold), wherein the resulting productive cycles counter may support varying polling intervals, multiple consumers and be readily converted into workload scalability. Block 36 may determine the scalability of the identified workload based on the counter values. For example, the ratio of productive cycles (e.g. PCNT value) to actual cycles (e.g., ACNT value) may provide a useful metric of the productivity/scalability of the workload in question. Thus, a ratio that is close to one would correspond to a relatively high scalability, whereas a ratio that is close to zero would correspond to a relatively low scalability, in this example.

A determination of one or more QoS constraints may be made at block 38, wherein the QoS constraints may include latency information and other quality-related information. Additionally, illustrated block 40 determines a power consumption of one or more portions of the platform, wherein the power consumption information may be particularly useful in mobile platform settings. Block 40 may also involve determining one or more thermal constraints for the platform. Additionally, block 42 may prioritize the workload and set a performance level based on the scalability, QoS constraints, thermal constraints and power consumption. Setting the performance level may involve accessing one or more control registers. The illustrated method 30 therefore provides substantial efficiency and responsiveness advantages over purely demand based switching (DBS) solutions that are limited to QoS information.

Variations may be readily made with respect to the illustrated method 30. For example, if scalability can be assessed relatively quickly in hardware, the workload identification at block 32 could be superfluous and therefore bypassed. Moreover, an operating system (OS) may provide QoS input irrespective of whether the hardware is aware of the identity or type of workload being processed. Additionally, the use of stalled versus non-stalled cycles as discussed with respect to blocks 34 and 36 may be a counter implementation detail that is particularly suitable for a CPU core. Other scalability solutions, however, may be more appropriate for other types of devices (e.g. memory, graphics, networking, "uncore").

Figure 4:
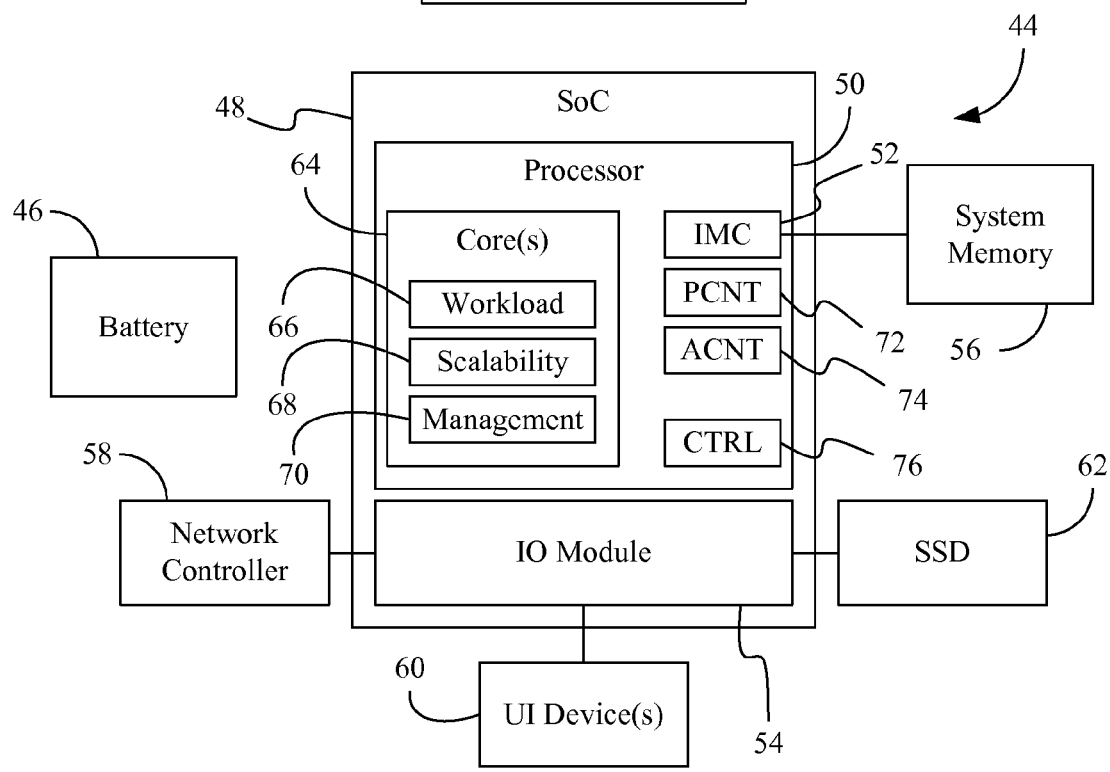
FIG. 4 is a block diagram of an example of a platform according to an embodiment.

Turning now to FIG. 4, a mobile platform 44 is shown. The platform 44 may be part of a mobile device having computing functionality (e.g., PDA, laptop, smart tablet), communications functionality (e.g., wireless smart phone), imaging functionality, media playing functionality (e.g., smart TV), or any combination thereof (e.g., MID). In the illustrated example, the platform 44 includes a battery 46 to provide power to the platform 44, system memory 56, a network controller 58, one or more user interface (UI) devices 60, a solid state disk (SSD) 62, and a system on chip (SoC) 48. The SoC 48 may include a processor 50 and an input output (IO) module 54, wherein the illustrated processor 50 includes an integrated memory controller (IMC) 52 and a core region with one or several processor cores 64. The processor 50 and the IO module 54 may alternatively be implemented on separate semiconductor dies, depending upon the circumstances.

The illustrated IO module 54, sometimes referred to as a Southbridge or South Complex of a chipset, functions as a host controller and communicates with the network controller 58, which could provide off-platform communication functionality for a wide variety of purposes such as, for example, cellular telephone (e.g., W-CDMA (UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 54 may also include one or more wireless hardware circuit blocks to support such functionality.

The system memory 56 may include, for example, double data rate (DDR) synchronous dynamic random access memory (SDRAM, e.g., DDR3 SDRAM JEDEC Standard JESD79-3C, April 2008) modules. The modules of the system memory 56 may be incorporated into a single inline memory module (SIMM), dual inline memory module (DIMM), small outline DIMM (SODIMM), and so forth. The SSD 62 may include one or more NAND (negated AND) chips and might be used to provide high capacity data storage and/or a significant amount of parallelism. There may also be solutions that include NAND controllers implemented as separate ASIC controllers being connected to the IO module 54 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. The SSD 62 could also be used as a USB (Universal Serial Bus, e.g., USB Specification 3.0, USB Implementers Forum) flash storage device.

The illustrated cores 64 of the processor 50 may generally process workloads associated with one or more applications executing on the processor 50, wherein the workloads may also be associated with communications conducted via the network controller 58 and/or in association with the system memory 56 and/or SSD 62. More particularly, the cores 64 may be configured to execute workload logic 66 that identifies workloads associated with the platform 44, scalability logic 68 that determines the scalability of the workloads, and management logic 70 that manages performance policies of the platform 44 based at least in part on the scalabilities. The workload logic 66, scalability logic 68 and management logic 70 may therefore function similarly to the performance controller 10 (FIG. 1), already discussed.

In one example, SoC 48 further includes a productive cycles counter 72 and an actual cycles counter 74, wherein the scalability logic 68 accesses the counters 72, 74 and determines the ratio of productive cycles to actual cycles in order to determine the scalabilities. The SoC 48 may also include one or more control registers 76 that the management logic 70 uses to set performance levels associated with the performance policies. For example, the management logic 70 might write one or more parameter values to the control registers 76 based on the workload scalabilities in order to place the processor 50 and/or platform in one or more ACPI (Advanced Configuration and Power Interface, e.g., ACPI Specification, Rev. 5.0a, Dec. 6, 2011) performance states.

Thus, techniques described herein may explain hardware responses (e.g., desired/requested versus delivered) without exposing the complexity of many scalability-related factors such as, for example, networking bandwidth, available memory, code complexity, etc. Moreover, the general cost of achieving a different rate of work completion may be articulated in a wide variety of settings and environments.

Embodiments may therefore include a method that involves determining a scalability of a workload associated with a platform. The method may also provide for managing a performance policy of the platform based at least in part on the scalability of the workload.

Embodiments may also include a non-transitory computer readable storage medium having a set of instructions which, if executed by a processor, cause a platform to determine a scalability of a workload associated with a platform. The instructions, if executed, may also cause the platform to manage a performance policy of the platform based at least in part on the scalability of the workload.

Embodiments may also include an apparatus having scalability logic to determine a scalability of a workload associated with a platform. The apparatus may also have management logic to manage a performance policy of the platform based at least in part on the scalability of the workload.

Embodiments may also include a mobile platform having a battery to supply power to the platform, a memory module, and an SoC coupled to the memory module, wherein the SoC includes scalability logic to determine a scalability of a workload associated with the platform. The SoC may also include management logic to manage a performance policy of the platform based at least in part on the scalability of the workload.

Embodiments of the present invention are applicable for use with all types of semiconductor integrated circuit ("IC") chips. Examples of these IC chips include but are not limited to processors, controllers, chipset components, PLAs, memory chips, network chips, SoCs, SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A mobile platform comprising:
a battery to supply power to the platform;
a memory module; and
a system on chip (SoC) coupled to the memory module, the SoC including,
scalability logic to determine a ratio of requested performance of a workload on the platform to delivered performance of one or more of the workload and the platform to determine a scalability of the workload, wherein the workload is to be classified based on the scalability, and wherein a relatively high scalability workload is to be determined to deliver more performance per unit of requested performance than a relatively less scalability workload, and management logic to manage a performance policy of the platform based at least in part on the scalability of the workload, wherein the management logic is to set a performance level of the platform to manage the performance policy by a request for more performance to obtain a particular delivered performance when the workload has a relatively low scalability and by a request for less performance to obtain the same particular delivered performance when the workload has a relatively high scalability.

2. The platform of claim 1, wherein the SoC further includes a productive cycles counter and the scalability logic is to access the productive cycles counter to determine the ratio of requested performance to delivered performance.

3. The platform of claim 1, wherein the SoC further includes one or more control registers and the management logic is to access at least one of the one or more control registers to set the performance level.

4. The platform of claim 1, wherein the management logic is to prioritize the workload to manage the performance policy.

5. The platform of claim 1, wherein the performance policy is to be managed further based on one or more of a quality of service (QoS) constraint of the workload and a power consumption of one or more portions of the platform.

6. The platform of claim 1, wherein the performance policy is to be managed further based on one or more thermal constraints of the platform.

7. The platform of claim 1, wherein the ratio of requested performance to delivered performance is to include a change in requested performance versus a change in delivered performance.

8. The platform of claim 7, wherein the change in requested performance versus the change in delivered performance is to include a percent change in performance for one or more of a system and subsystem of the platform versus a percent change in performance realized by the workload on the platform.

9. The platform of claim 1, wherein the ratio of requested performance to delivered performance is to account for one or more of a type of workload and a type of hardware to process the type of workload, wherein the scalability of a same type of workload is allowed to vary with respect to a different type of hardware.

10. An apparatus comprising a processor to implement:
scalability logic to determine a ratio of requested performance of a workload on the apparatus to delivered performance of one or more of the workload and the apparatus to determine a scalability of the workload, wherein the workload is to be classified based on the scalability, and wherein a relatively high scalability workload is to be determined to deliver more performance per unit of requested performance than a relatively less scalability workload; and
management logic to manage a performance policy of the apparatus based at least in part on the scalability of the workload, wherein the management logic is to set a performance level of the apparatus to manage the performance policy by a request for more performance to obtain a particular delivered performance when the workload has a relatively low scalability and by a request for less performance to obtain the same particular delivered performance when the workload has a relatively high scalability.

11. The apparatus of claim 10, wherein the scalability logic is to access a productive cycles counter to determine the ratio of requested performance to delivered performance.

12. The apparatus of claim 10, wherein the management logic is to set a performance level of the apparatus to manage the performance policy.

13. The apparatus of claim 12, wherein the management logic is to access one or more control registers on the apparatus to set the performance level.

14. The apparatus of claim 10, wherein the management logic is to prioritize the workload to manage the performance policy.

15. The apparatus of claim 10, wherein the performance policy is to be managed further based on one or more of a quality of service (QoS) constraint of the workload and a power consumption of one or more portions of the apparatus.

16. The apparatus of claim 10, wherein the performance policy is to be managed further based on one or more thermal constraints of the apparatus.

17. A method comprising:
determining a ratio of requested performance of a workload on a platform to delivered performance of one or more of the workload and the platform to determine a scalability of the workload, wherein the workload is classified based on the scalability, and wherein a relatively high scalability workload is determined to deliver more performance per unit of requested performance than a relatively less scalability workload; and
managing a performance policy of the platform based at least in part on the scalability of the workload including setting a performance level of the platform to manage the performance policy by requesting more performance to obtain a particular delivered performance when the workload has a relatively low scalability and by requesting less performance to obtain the same particular delivered performance when the workload has a relatively high scalability.

18. The method of claim 17, wherein determining the ratio of requested performance to delivered performance includes accessing a productive cycles counter.

19. The method of claim 17, wherein managing the performance policy includes setting a performance level of the platform.

20. The method of claim 19, wherein setting the performance level includes accessing one or more control registers on the platform.

21. The method of claim 17, wherein managing the performance policy includes prioritizing the workload.

22. The method of claim 17, wherein the performance policy is managed further based on one or more of a quality of service (QoS) constraint of the workload and a power consumption of one or more portions of the platform.

23. The method of claim 17, wherein the performance policy is managed further based on one or more thermal constraints of the platform.

24. A non-transitory computer readable storage medium comprising a set of instructions which, if executed by a processor, cause a platform to:
determine a ratio of requested performance of a workload on a platform to delivered performance of one or more of the workload and the platform to determine a scalability of the workload, wherein the workload is to be classified based on the scalability, and wherein a relatively high scalability workload is to be determined to deliver more performance per unit of requested performance than a relatively less scalability workload; and
manage a performance policy of the platform based at least in part on the scalability of the workload, wherein the management logic is to set a performance level of the platform to manage the performance policy by a request for more performance to obtain a particular delivered performance when the workload has a relatively low scalability and by a request for less performance to obtain the same particular delivered performance when the workload has a relatively high scalability.

25. The medium of claim 24, wherein the instructions, if executed, cause the platform to access a productive cycles counter to determine the ratio of requested performance to delivered performance.

26. The medium of claim 24, wherein the instructions, if executed, cause the platform to set a performance level of the platform to manage the performance policy.

27. The medium of claim 26, wherein the instructions, if executed, cause the platform to access one or more control registers on the platform to set the performance level.

28. The medium of claim 24, wherein the instructions, if executed, cause the platform to prioritize the workload to manage the performance policy.

29. The medium of claim 24, wherein the performance policy is to be managed further based on one or more of a quality of service (QoS) constraint of the workload and a power consumption of one or more portions of the platform.

30. The medium of claim 24, wherein the performance policy is to be managed further based on one or more thermal constraints of the platform.

\* \* \* \* \*